United States Patent [19]

Eder

[11] 4,449,759
[45] May 22, 1984

[54] SERVICE BRAKE ACCELERATOR FOR RAIL VEHICLE AIR BRAKE SYSTEMS

[75] Inventor: Herbert Eder, Markt Schwaben, Fed. Rep. of Germany

[73] Assignee: Knorr-Bremse GmbH, Munich, Fed. Rep. of Germany

[21] Appl. No.: 396,501

[22] Filed: Jul. 8, 1982

[30] Foreign Application Priority Data

Jul. 14, 1981 [DE] Fed. Rep. of Germany ....... 3127775

[51] Int. Cl.$^3$ ............................................. B60T 15/38
[52] U.S. Cl. ...................................... 303/38; 303/82; 303/83
[58] Field of Search .............................. 303/86, 81–83, 303/80, 43, 44, 33, 35–39, 45–46, 68–69, 72–79, 84, 66, 70

[56] References Cited

U.S. PATENT DOCUMENTS

| | | | |
|---|---|---|---|
| 3,022,116 | 2/1962 | Hewitt | 303/33 X |
| 4,025,126 | 5/1977 | Wilson | 303/69 X |
| 4,073,544 | 2/1978 | Hart | 303/38 X |
| 4,113,319 | 9/1978 | Zoric | 303/82 X |
| 4,145,090 | 3/1979 | Hart | 303/69 X |
| 4,206,949 | 6/1980 | Rathband et al. | 303/82 X |
| 4,226,482 | 10/1980 | Stäuble et al. | 303/37 X |

*Primary Examiner*—Douglas C. Butler
*Attorney, Agent, or Firm*—Pollock, Vande Sande & Priddy

[57] ABSTRACT

A service brake accelerator having a line chamber (3) connected to the main air supply line (1) and a reference pressure chamber (6) connected to the line chamber via a nozzle (7). The line chamber is separated from the reference pressure chamber by a diaphragm piston (5) which is biased by a spring (10) against a valve seat (9) projecting into the reference pressure chamber and restricting a nozzle opening (23) to the inner chamber (24) of a second valve seat (20). A second diaphragm piston (17) is biased against this second valve seat by a spring (21). The space (16) surrounding the second valve seat can be connected, partly throttled, via a nozzle (14), to the line chamber by way of a shut-off valve (12, 13) which opens laterally of the reference pressure chamber upon overbalancing pressure upon the first diaphragm piston; this space is always open to atmosphere via a further nozzle (25). The accelerator operates cyclically and has a safe, stable neutral position between its work cycles and rest position.

3 Claims, 1 Drawing Figure

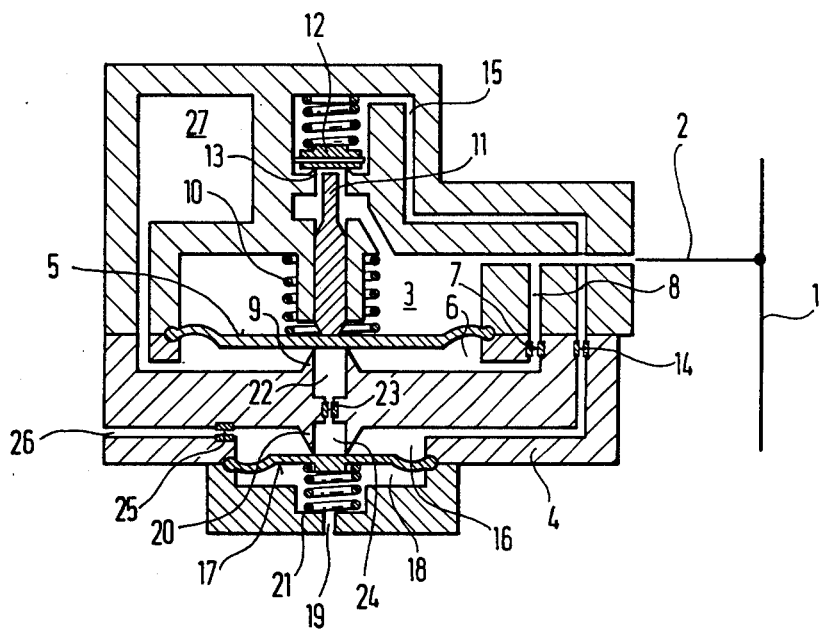

SERVICE BRAKE ACCELERATOR FOR RAIL VEHICLE AIR BRAKE SYSTEMS

SUMMARY OF THE INVENTION

The present invention relates to a service brake accelerator for rail vehicle air brake systems.

BACKGROUND OF THE INVENTION

A service brake accelerator of this type is known, e.g., from U.S. Pat. No. 4,206,949, which shows a reference pressure chamber connected to a brake control valve which contains a charging device, with throttle, for the reference pressure chamber from the main air supply. Thus, the prior art service brake accelerator is connected only to appropriate brake control valves, e.g., of the multi-release type, or independently of brake control valves. In the known device, the first piston element controls only the first valve. The second piston element is connected to a push rod which terminates at a distance from the closure element of the shut-off valve, and thus can open the latter after opening of the second valve. Only this shut-off valve and the third nozzle are located in a vent channel between the main air supply and atmosphere. The piston elements in the known device are formed as sealing elements for the first and second valves.

A further service brake accelerator with a nozzle between the line chamber and reference pressure chamber is known from U.S. Pat. No. 4,145,090. Here, too, two piston elements formed as diaphragm pistons are provided, the one of these elements which separates the line chamber from the reference pressure chamber controlling a relatively versatile change-over valve. Depending on the stroke adjustment of this piston element, the change-over valve either disconnects a nozzled vent from other connections, or connects the vent with both the main air supply and simultaneously with a chamber acting upon the other piston, or upon disconnection from the main air supply, only with the latter chamber. The other piston element is spring-biased against a valve seat having chambers on either side, the chamber on one side being connected with the reference pressure chamber and the chamber on the other side being connected via a nozzle with atmosphere. This known service brake accelerator, as already pointed out, discloses a complicated, demanding valve structure. In further known embodiments of this service brake accelerator additional structure is required for further valve and nozzle components between chambers on either side of the second piston element.

U.S. Pat. No. 4,073,544 discloses a further service brake accelerator, which however requires three piston elements in the form of diaphragm pistons, as well as a supplemental valve device between the reference pressure chamber and the line chamber. The construction of this service brake accelerator is hence even more complicated and demanding than that of the just described service brake accelerator.

PURPOSE OF THE INVENTION

The object of the present invention is a pulsating service brake accelerator which functions dependably, returns safely to a stabilized neutral position, and is simply constructed from a few simple components.

BRIEF INTRODUCTION TO THE DRAWING

The drawing is a schematic section view of an embodiment of the service brake accelerator according to the invention.

DESCRIPTION OF PREFERRED EMBODIMENT

From a main air supply line 1, a branch line 2 leads into a line chamber 3 in a housing 4 of the service brake accelerator. Line chamber 3 is separated from a reference pressure chamber 6 through a piston element in the form of a diaphragm piston 5. A channel 8 having a nozzle 7 connects line chamber 3 with reference pressure chamber 6. Within reference pressure chamber 6, housing 4 comprises a valve seat 9 which, together with diaphragm piston 5, forms a valve 5, 9. A spring 10 located in line chamber 3 biases diaphragm piston 5 against valve seat 9. Laterally of line chamber 3, a push rod 11 abuts diaphragm piston 5, said push rod 11 being displaceably guided in housing 4 and terminating at its other end at a slight distance from a valve seal 12. This spring-loaded valve seal 12, in combination with a valve seat 13 fixed in the housing, forms a valve 12, 13 which is in series with a channel 15 leading through a nozzle 14 from line chamber 3 to a chamber 16.

Chamber 16 is separated by a piston element 17, also comprising a diaphragm piston, from a chamber 18 which is in constant communication with atmosphere through an opening 19. Projecting into chamber 18 is a valve seat 20 fixed to the housing. Diaphragm piston 17 is biased against this valve seat by a spring 21 arranged in chamber 18. A chamber 22, which is separated from reference pressure chamber 6 by valve seat 9, communicates with a chamber 24, separated from chamber 16 by means of valve seat 20, through a connection comprising a nozzle 23. Thus, valve 5, 9 controls the connection between reference pressure chamber 6 and chamber 22, while valve 17, 20, comprising diaphragm piston 17 and valve seat 20, controls the connection between chambers 16 and 24. A perpetually open channel 26 containing a nozzle 25 leads from chamber 16 to atmosphere. The volume of reference pressure chamber 6 is enlarged by a cavity 27 contained within housing 4.

The two diaphragm pistons 5 and 17, as well as valves 5, 9, as well as 12, 13 and 17, 20 are located coaxially with one another in housing 4, reference pressure chamber 6 and chamber 16 in each case forming annular spaces which are separated from centrally located chambers 22 and 24, respectively, by means of valve seats 9 and 20, respectively.

During application of the air brake system, the service brake accelerator assumes the switching position illustrated in the drawing, line chamber 3 as well as reference pressure chamber 6 and cavity 27 being charged with regulating pressure from main air supply 1. The remaining chambers of the service brake accelerator are vented, and all valves are closed.

If the pressure in the main air supply is lowered for the purpose of a braking operation, the pressure in line chamber 3 drops correspondingly with the pressure in the main air supply, while the pressure in reference pressure chamber 6 is retained due to nozzle 7, and hence cannot drop correspondingly. Diaphragm piston 5 is then overwhelmingly impacted from the side of reference pressure chamber 6, and lifts, as soon as a differential pressure determined by spring 10 is reached, from valve seat 9 upon opening of valve 5, 9.

Pressurized air now flows from reference pressure chamber 6 into the relatively small chambers 22 and 24, connected through nozzle 23, while spring 21 retains valve 17, 20 in continued closed position. If the pressure falls further in line chamber 3, diaphragm piston 5 moves further, causing valve plate 12 to lift from valve seat 13 upon opening of valve 12, 13, through the action of push rod 11. Pressurized air now flows from line chamber 3 and thus main air supply 1 through opened valve 12, 13, channel 15 and nozzle 14 into chamber 16, and from the latter partly through nozzle 25 and channel 26 to atmosphere. Back pressure is thus built up in chamber 16, and this, when it reaches a certain value, suffices to move diaphragm piston 17 against the force of spring 21 and thereby to open valve 17, 20.

Pressurized air, throttled by nozzle 23, now flows to chamber 16 through opened valves 5, 9 and 17, 20 and thence through nozzle 25 to atmosphere, whereby in reference pressure chamber 6, the volume of which is small with respect to the main air supply despite enlargement through cavity 27, a pressure drop occurs which begins to catch up with the pressure drop in the main air supply. As soon as the differential pressure operating on diaphragm piston 5 has become low enough due to the faster—with respect to line chamber 3—pressure drop in reference pressure chamber 6, spring 10 biases diaphragm piston 5 in the direction of reference pressure chamber 6 until valve 12, 13 is closed. This causes interruption of the acceleration of the pressure drop for the main air supply 1 and simultaneously the pressurized air back feed into chamber 16 from the main air supply through nozzle 14. Chamber 16 is thus provided with pressurized air back feed only from reference pressure chamber 6, so that the latter experiences an accelerated pressure drop which causes rapid continuation of the movement of diaphragm piston 5 until it is seated on valve seat 9 and valve 5, 9 is closed. This also causes an interruption in the pressurized air back feed from reference pressure chamber 6 into chamber 16, and the latter evacuates through nozzle 25 to atmosphere, the force of spring 21 being sufficient to seat diaphragm piston 17 on valve seat 20 and thus to close valve 17, 20. The switching position illustrated in the drawing is thereby resumed as a stable neutral position, and the reduction cycle for the main air supply pressure is concluded.

Should reduction of the main air supply pressure continue, the just described operations are repeated, pressure air from the main supply 1 being bled off to atmosphere during each operating cycle and the pressure drop in the main air supply 1 thus being accelerated. If the pressure in the main air supply does not drop further at the end of such a cycle, the service brake accelerator remains in the attained neutral position.

Upon release of the brakes the pressure in the main air supply line is again raised to the regulation pressure level, line chamber 3 and, with delay through nozzle 7, reference pressure chamber 6 being reloaded to the regulation pressure level. The service brake accelerator remains in the illustrated neutral position during this loading process. After completion of loading, the initial position is reattained.

What is claimed is:

1. A pulsating device brake accelerator for rail vehicle air brake systems, said accelerator cyclically venting air from a main air supply to atmosphere, and returning to a neutral position between its working cycles and at the end of a brake line pressure drop, said accelerator comprising
   (a) a first movable abutment (5) subject to the pressure in a line chamber (3) connected to a main air supply (1), and, against the force of a spring (10), to the pressure in a reference pressure chamber (6) connected to said main air supply through a nozzle (7);
   (b) said first movable abutment, upon application of overbalancing pressure, effecting the opening of a first valve means (5, 9) in a connection, through a first choke (23), between said reference pressure chamber and a first chamber (24) bounded by a valve seat (20);
   (c) a second movable abutment (17) seatable upon said valve seat under pressure of a spring (21) so as to close said valve seat, and forming a second valve means (17, 20) in combination with said valve seat;
   (d) a second chamber (16) separated from said first chamber by said valve seat, said second chamber being in continuous communication with atmosphere through a ventilation channel (26) with a second choke (25);
   (e) a channel (15) with a third choke (14), connecting said main air supply with atmosphere, through a shut-off valve (12, 13) adapted to be opened laggingly after one of said valve means by a said movable abutment;
   (f) said shut-off valve (12, 13) being disposed for opening by said first movable abutment (5) laggingly after said first valve means (5, 9);
   (g) said channel (15) terminating in said second chamber (16).

2. Service brake accelerator according to claim 1, wherein said first and second movable abutment (5, 17) comprise diaphragm constituting closure means for said first (5, 9) and second (17, 20) valve means, respectively, said first movable abutment (5) on its line chamber side carrying a push rod which, in its rest position, terminates at a distance from a closure means of said shut-off valve located in a connection between said line chamber and said ventilating channel (15).

3. Service brake accelerator according to claim 1 or 2, wherein said first and second movable abutments (15, 17), said first and second valve means and said shut-off valve are all disposed coaxially with respect to one another.

* * * * *